United States Patent [19]

Buchanan, Jr. et al.

[11] Patent Number: 5,226,200
[45] Date of Patent: Jul. 13, 1993

[54] SPACE CRANK WIPER SYSTEM WITH ADJUSTABLE WIPE PATTERN

[75] Inventors: Harry C. Buchanan, Jr.; Peter S. Zhou, both of Spring Valley, Ohio

[73] Assignee: General Motors Corporation, Detroit, Mich.

[21] Appl. No.: 952,001

[22] Filed: Sep. 28, 1992

Related U.S. Application Data

[63] Continuation-in-part of Ser. No. 697,548, May 9, 1991, abandoned.

[51] Int. Cl.$^5$ .............................. B60S 1/18; B60S 1/06
[52] U.S. Cl. ............................... 15/250.13; 15/250.14; 15/250.27; 15/250.30; 74/833; 74/48
[58] Field of Search .......... 15/250.13, 250.14, 250.16, 15/250.27, 250.30, 250.34; 74/25, 95, 51, 79, 600, 601, 837, 833, 48, 70, 75

[56] References Cited

U.S. PATENT DOCUMENTS

| | | | |
|---|---|---|---|
| 2,173,447 | 9/1939 | Horton | 15/255 |
| 2,393,193 | 1/1946 | Sacchini | 74/50 |
| 2,494,538 | 1/1950 | Baldo | 74/79 |
| 3,110,920 | 11/1963 | Dangler | 15/250.16 |
| 3,282,120 | 11/1966 | Compton | 74/75 |
| 4,358,869 | 11/1982 | Frankus | 15/250.3 |
| 4,791,698 | 12/1988 | Murata | 15/250.13 |
| 4,934,014 | 6/1990 | Yamamoto | 15/250.13 |

FOREIGN PATENT DOCUMENTS 647312 10/1962 Italy.
63-141857 6/1988 Japan.
516232 12/1939 United Kingdom.

Primary Examiner—Harvey C. Hornsby
Assistant Examiner—Gary K. Graham
Attorney, Agent, or Firm—Patrick M. Griffin

[57] ABSTRACT

An adjustment mechanism uniquely tailored to a space crank wiper system is used to adjust the wipe angle, specifically to lower the inwipe to give a depressed park position. The characteristic spacing of a four bar spatial mechanism that drives the wiper post is shortened by a jack screw mechanism that shifts an input crank closer to the wiper post. This lowers the inwipe position. A worm wheel selectively holds or turns the jackscrew, which axially moves a splined stub shaft in the end of a drive shaft to move the crank back and forth.

2 Claims, 3 Drawing Sheets

SPACE CRANK WIPER SYSTEM WITH ADJUSTABLE WIPE PATTERN

This is a continuation-in-part of Ser. No. 07/697,548, filed May 9, 1991, now abandoned.

This invention relates to vehicle wiper systems in general, and specifically to a space crank driven wiper that incorporates a means for adjusting the wipe pattern.

BACKGROUND OF THE INVENTION

Wipers driven by mechanical mechanisms cover a normal wipe pattern the limits of which are determined by the parameters of the mechanism. Typically, the mechanism is a four bar linkage. It is often desired to lower the inwipe limit of the wipe pattern, allowing the wiper to be stopped or "parked" at a more unobtrusive position. Myriad park mechanisms exist, most of which reverse the main drive motor at the end of the wipe cycle to cause a link in the system to lengthen. More rare are systems that provide for actively changing the limits of the wipe pattern as the wiper operates. These incorporate a dedicated motor or other power source separate from the main wiper drive motor.

Less common are wipers driven by spatial mechanisms, in which continuous rotation about an axis is translated into oscillation of a wiper post about an arbitrarily chosen axis. Conventional park mechanisms used with four bar linkages would not translate well to a spatial mechanisms. A park mechanism suited to a spatial mechanism, especially one that allowed the wipe pattern to be actively changed, would be useful.

SUMMARY OF THE INVENTION

The invention provides a mechanism for changing the normal wipe pattern of a spatial mechanism wiper system.

The invention is incorporated in a wiper system in which a single, central drive shaft rotated by a main drive motor drives a pair of wiper posts through a pair of spatial mechanisms located between the ends of the drive shaft and the wiper posts. Each spatial mechanism includes a crank fixed to an end of the drive shaft and a yoke pivoted to the wiper post. A stem of the yoke is slidably received through a spherical bearing in the end of the crank. As the drive shaft turns the crank, the yoke stem slides backs and forth through the spherical bearing, which is rocked around. The yoke is twisted back and forth to oscillate the wiper post through a predetermined angle that produces the desired wipe pattern.

The angle produced is determined by the particular configuration of the spatial mechanism, which can be expressed in terms of two parameters, radius and height. The radius is determined by the effective length of the crank, which is fixed, while the height is the distance between the point of intersection of the axes of the drive shaft and yoke stem and the point of intersection of a perpendicular to the drive shaft axis from the center of the spherical bearing. The wipe pattern is changed if the normal height is changed. This is done by a mechanism separate from the main drive motor that shortens or lengthens the drive shaft, moving its terminal end and the crank fixed thereto relative to the wiper post. In the embodiment disclosed, this is done specifically to lower the inwipe limit of the wipe pattern, providing a depressed park position at the end of the wipe cycle.

It is, therefore, a general object of the invention to provide a means for adjusting the wipe pattern of a spatial mechanism driven wiper.

It is another object of the invention to provide such an adjustment mechanism in which the characteristic height of the spatial mechanism is changed in order to change the wipe pattern.

It is another object of the invention to provide such an adjustment mechanism in which the length of a drive shaft is changed in order to change the height of the spatial mechanism.

It is still another object of the invention to provide a wipe pattern adjustment mechanism that cooperates uniquely with a particular spatial mechanism.

DESCRIPTION OF THE PREFERRED EMBODIMENT

These and other objects and features of the invention will appear from the following written description, and from the drawings, in which.

Figure 1:
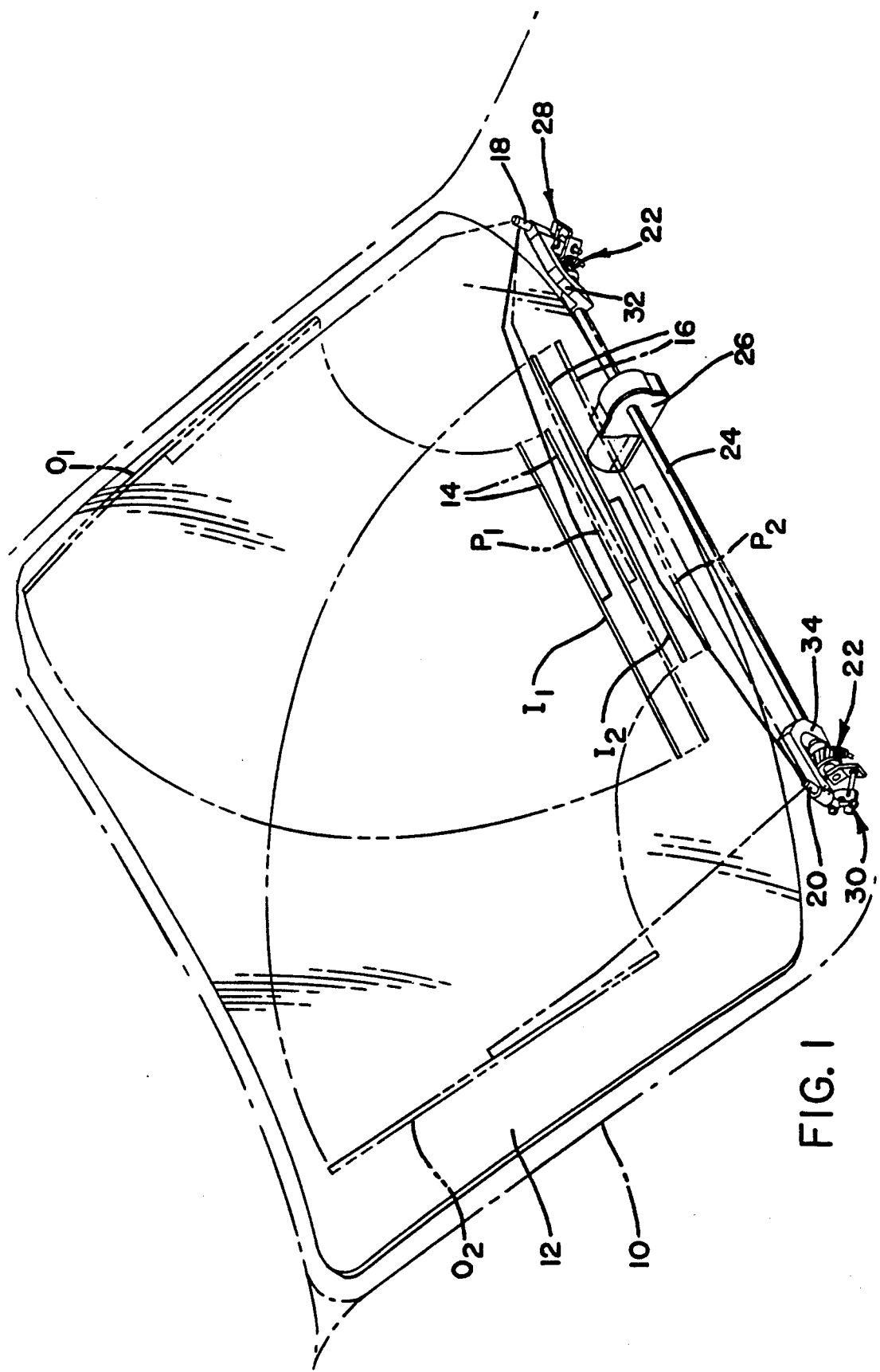
FIG. 1 is a perspective view of a vehicle windshield and wiper system incorporating the invention.

Referring first to FIG. 1, a vehicle body, indicated generally at 10, has a windshield 12 that is wiped by a first, driver side wiper 14, and a second, passenger side wiper 16. Each wiper 14 and 16 is fixed to a respective wiper post 18 and 20, which are journaled to the vehicle body 10. The wiper posts 18 and 20 are located at the same distance from the lower edge of windshield 12 and are basically symmetrical to the center plane of vehicle body 10, as well as substantially perpendicular to the plane of the windshield 12. Each wiper 14 and 16 wipes a normal pattern on the windshield 12 that extends over a wipe cycle from an inwipe position $I_1$ and $I_2$ respectively to an outwipe position $O_1$ and $O_2$ and back, moving simultaneously and in opposite directions. The normal wipe pattern results from the mechanisms used to drive the wipers 14 and 16, described in detail below. Provision is also made to adjust the normal wipe pattern, specifically to lower each wiper 14 and 16 to a depressed park position $P_1$ and $P_2$ respectively.

Figure 2:
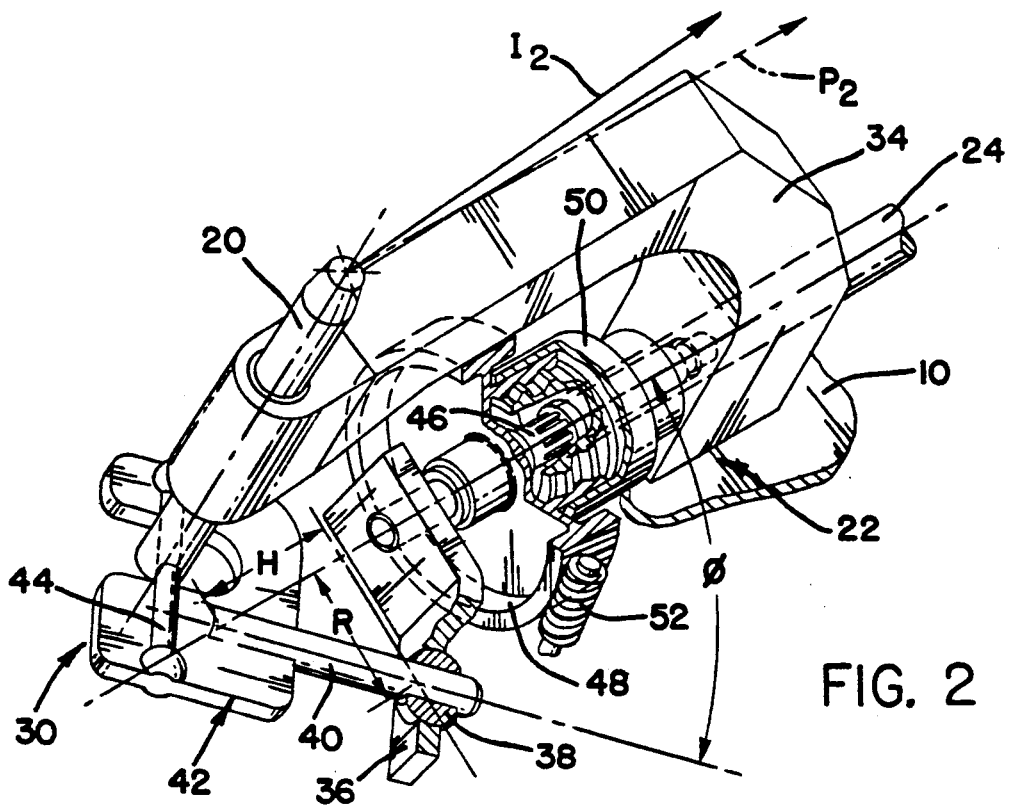
FIG. 2 is a perspective view of the one end of the drive shaft showing one spatial mechanism incorporating a preferred embodiment of the wipe pattern adjustment mechanism of the invention, in the normal inwipe position.

Referring next to FIGS. 1 and 2, a preferred embodiment of the wipe pattern adjustment mechanism of the invention is indicated generally at 22, the details of which are described later. One such mechanism 22 would be provided for each wiper 14 and 16, so only that used with the passenger side wiper 16 is illustrated in detail. Each mechanism 22 works in cooperation with a straight, tubular drive shaft 24, which is turned by a main drive motor 26 around a central axis shown by a dotted line. Each mechanism 22 in effect constitutes a movable terminal end of shaft 24, spaced from a respective wiper post 18 and 20. In the intervening space between each mechanism 22 and wiper post 18 and 20 are a pair of spatial mechanisms, indicated generally at 28 and 30 respectively, which translate the continuous rotation of shaft 24 into oscillation of the wiper post 18 and 20. A pair of generally L shaped journal brackets 32 and 34 fixed to vehicle body 10 provide a journal for the ends of drive shaft 24, and also for the wiper posts 18 and 20. The center axis of drive shaft 24 does not directly intersect the central axes about which the wiper posts 18 and 20 oscillate, but is generally perpendicular thereto.

Referring next to FIG. 2, the details of the passenger side spatial mechanism 30 are illustrated, which is essentially identical to 28. FIG. 2 shows the situation where wiper 16 is at $I_2$, the lower or inwipe limit of the normal wiper pattern. Spatial mechanism 30 is the four bar type, with an input crank 36 fixed at its inner end to adjustment mechanism 22, in effect fixed to the terminal end of drive shaft 24. At the other end of input crank 36 is a spherical bearing 38 that can rock around its center point within the end of crank 36. Another link is provided by the elongated stem 40 of a yoke 42, the central axis of which is indicated by a dotted line. Stem 40 passes through the center of spherical bearing 38, and can slide back and forth through it. Yoke 42 is joined to the lower end of wiper post 20 by a pivot shaft 44 perpendicular thereto. In the inwipe position shown, the central axis of drive shaft 24, the center point of spherical bearing 38, and the point where the central axis of wiper post 20 intersects pivot shaft 44, are all three coplanar. When crank 36 is reversed 180 degrees, all three would be coplanar again, defining the outwipe position. In general, the designer chooses the various lengths and dimensions for input crank 36 and yoke 42 to give an oscillation angle of wiper post 20 that will produce the desired wiper pattern limits for wiper 16. No attempt is made to give analytical formulae to absolutely determine those lengths here, which are treated as a given. Instead, various parameters are noted that describe the particular configuration of spatial mechanism 30.

Still referring to FIG. 2, the operating parameters of spatial mechanism 30 are illustrated. The input angle $\theta$ of crank 36, measured downwardly from that coplane, is zero in FIG. 2, and so cannot be specifically illustrated. The angle $\phi$ between the axis of shaft 24 and stem 40, which can be termed the output angle, corresponds to the wipe angle of the wiper 16. The angle $\phi$ is a function of $\theta$, and of two other quantities, spacing and radius, that depend on the size of the various links in spatial mechanism 30. The normal spacing H is the distance between the point of intersection of the central axis of drive shaft 24 and stem 40 and the point where a perpendicular line from the center point of spherical bearing 38 intersects the central axis of drive shaft 24. The radius R is the length of the perpendicular line segment between the axis of shaft 24 and center of spherical bearing 38, in other words, the effective length of crank 36, which is not straight.

Figure 3:
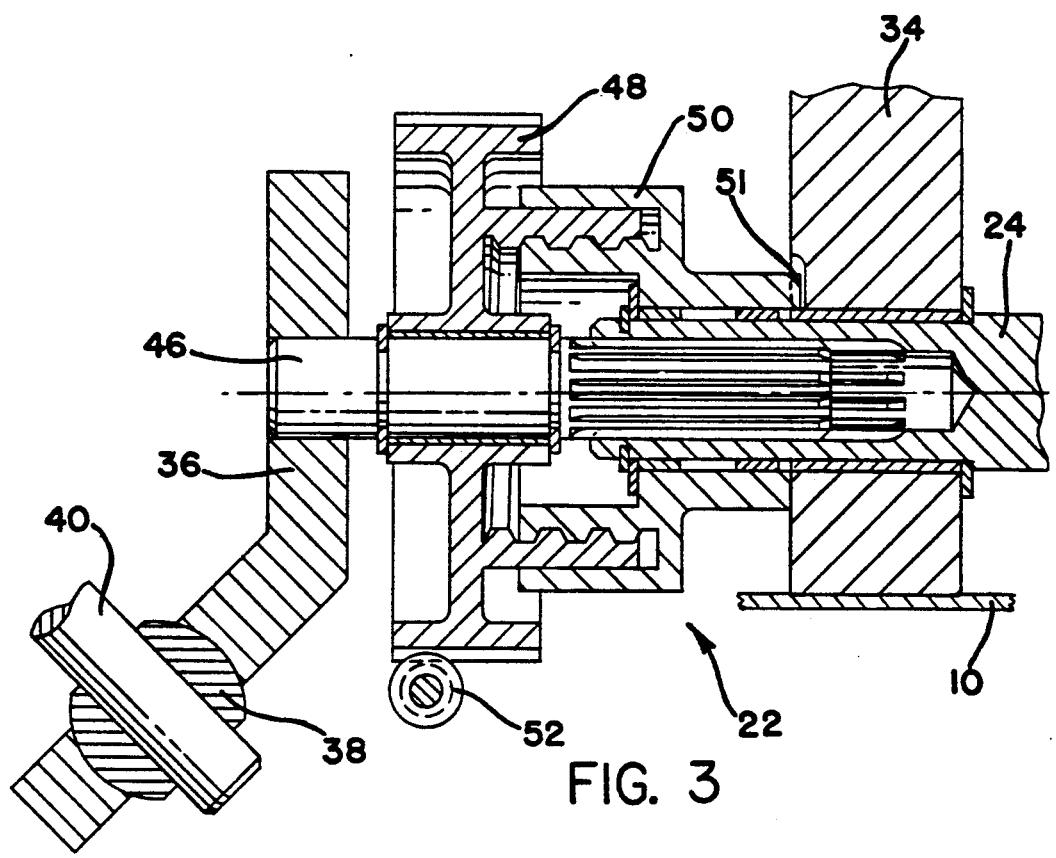
FIG. 3 is a cross section through the adjustment mechanism showing some of the structure in elevation.

Referring next to FIG. 3, the details of adjustment mechanism are illustrated. Input crank 36 is attached indirectly to drive shaft 24 through adjustment mechanism 22, specifically through a short splined stub shaft 46 that is adapted to slide axially back and forth in shaft 24. When stub shaft 46 is axially held relative to drive shaft 24, a value for H is determined. The stub shaft 46 is axially held by a worm wheel 48 that is axially captured on stub shaft 46, but which can turn freely thereon. Worm wheel 48, in turn, is axially held by a jack screw assembly 50, which is nonturnably secured by key 51 to bracket 34. Drive shaft 24 can turn freely within the nonturnable jack screw assembly 50. Worm wheel 48 is selectively held or turned by a worm gear 52 that is driven by a motor separate and independent from main drive motor 26, not illustrated.

Figure 4:
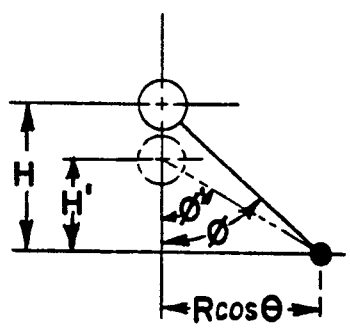
FIG. 4 is a schematic showing the spacing and output angle of the spatial mechanism.
Figure 5:
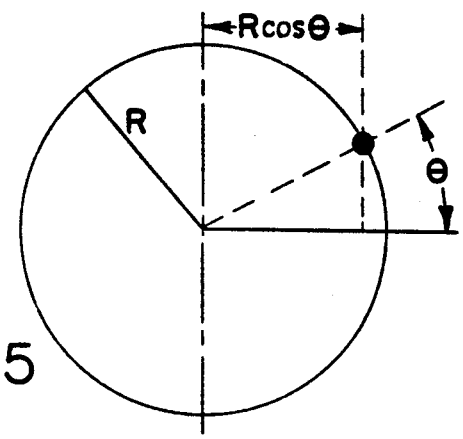
FIG. 5 is a schematic showing the radius and input angle of the spatial mechanism.

Comparing FIGS. 2, 4 and 5, the relation of the parameters detailed above is illustrated. The specific mathematical formula or function is $\phi = \arctan[(R \times \cos \theta)/H]$, which is shown graphically. The value of $\phi$ when $\theta$ is zero and 180 degrees determines the inwipe and outwipe limits of the normal wipe pattern of wiper 16. In FIG. 4, it may be seen that if H is reduced to H', then the output angle $\theta$ is enlarged to $\phi'$, shown by dotted lines. If it is desired, for example, to change the normal wipe pattern by lowering the inwipe position, thereby giving a depressed park position, this can be done by decreasing H enough to in turn increase $\phi$ enough, to lower $I_2$ to $P_2$. The particular structural elements of spatial mechanism 30, cooperating with the adjustment mechanism 22, allow H to be so changed.

Figure 6:
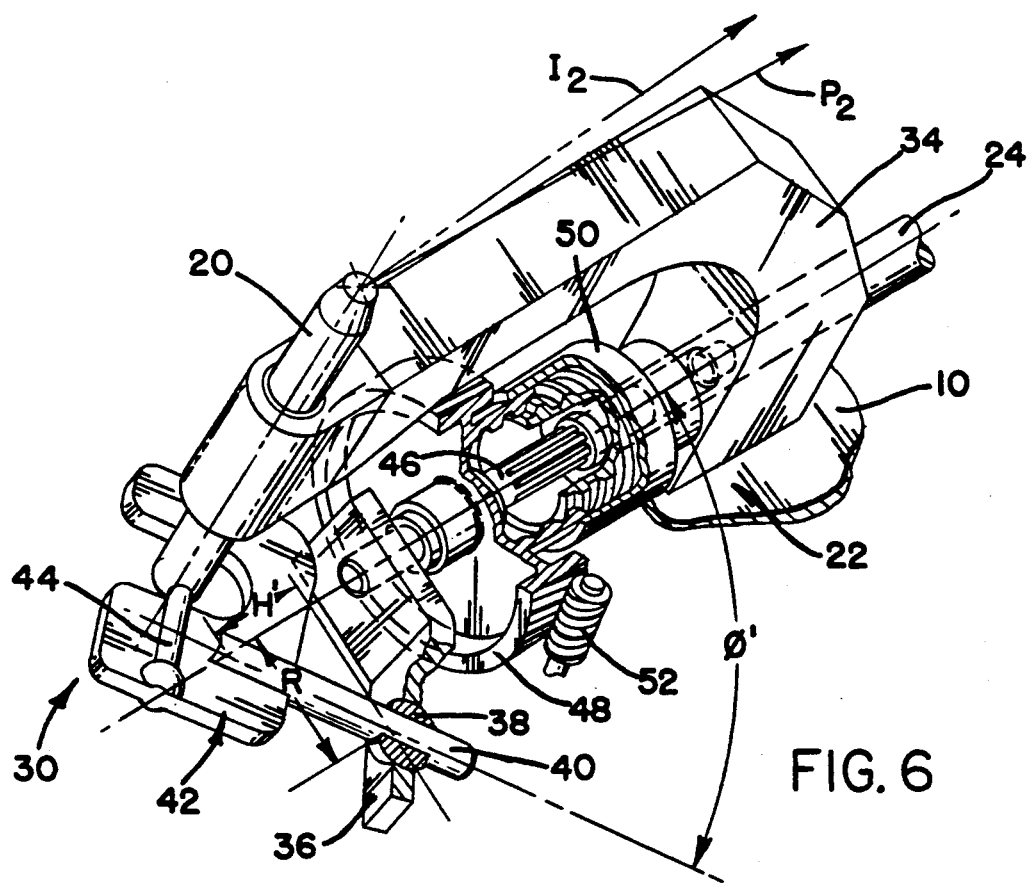
FIG. 6 is a view like FIG. 2, but showing a depressed park position below the normal inwipe position.

Referring next to FIGS. 2, 3 and 6, the operation of adjustment mechanism 22 is illustrated. During wiping operation, drive shaft 24 is turned at a constant rate by main drive motor 26. Shaft 24 turns within bracket 32, and also turns freely within jack screw assembly 50 and worm wheel 48, which are held stationary by worm gear 52. Drive shaft 24 turns stub shaft 46 with it, one to one, as if the two were a single shaft. Crank 36 rotates around the axis of shaft 24 as stem 40 slides and rocks within spherical bearing 38. Yoke 42 is twisted back and forth, oscillating wiper post 20 back and forth to sweep wiper 16 back and forth over the normal wipe pattern. The equivalent operation occurs for spatial mechanism 28 and wiper 14. When the wiper system was turned off, a suitable circuit would sense when the spatial mechanism 30 had returned to the $I_2$, coplanar position of FIG. 2. Then, the worm gear 52 would be energized to turn worm wheel 48 and jack screw assembly 50. Jack screw assembly would react off of bracket 32 to push worm wheel 48 to the left, taking stub shaft 46 with it. Worm wheel 48 is thick enough in the axial direction to maintain contact between itself and worm gear 52 as it moves. Crank 36 is pushed closer toward wiper post 20 as stem 40 slides through spherical bearing 38, enough to reduce H to H'. concurrently, yoke 42 is twisted slightly clockwise, which does the same for wiper post 20 and wiper 16, lowering wiper 16 to the $P_2$ position desired. R remains substantially the same, because the center point of bearing 38 translates parallel to the center axis of drive shaft 24. The equivalent occurs for the other adjustment mechanism 22 and wiper 14, which moves to $P_1$.

As disclosed, adjustment mechanism 22 is used as a park mechanism. However, it also has the potential to be used to actively change the wipe pattern angle per se, enlarging it or reducing it by changing the configuration of spatial mechanism 30. If the wiper system were to be run in the FIG. 6 configuration, without first returning it to the FIG. 2 condition, the effect would be to enlarge the entire wipe pattern, with a raised outwipe position $O_2$ higher, as well as a lower inwipe limit. Conversely, the adjustment mechanism could be used to effectively shorten shaft 24, pulling crank 36 away from the wiper post 20 to enlarge H. This would have the effect of reducing the overall wipe pattern angle. Furthermore, the invention could be used to actively change the overall wipe angle as the wiper system operated, since it can be energized independently of the main drive motor 26.

Variations in the preferred embodiment could be made. Incorporating an adjustment mechanism that changed the characteristic configuration of the spatial mechanism by changing either of the parameters R or H would change the resultant wipe pattern. Myriad different combinations of turning, sliding and rocking joints can be devised to create a spatial mechanism, so the broad concept is not limited to the particular spatial mechanism 30 disclosed. In the preferred embodiment disclosed, however, the particular spatial mechanism 30 (or 28) lends itself well to changing H while leaving R constant, since crank 36 is solid, and since a stub shaft like 46 can be conveniently used to slide within the end of drive shaft 24 to change H. Conceivably, something like an adjustable input crank 36 could be devised to change R while holding H constant. However, the particular interconnection of spherical bearing 38 with the stem 40 sliding therethrough cooperates uniquely well with the adjustment mechanism 22. Should some structural elements be slightly out of alignment, bearing 38 can rock to an extent to compensate. Furthermore, some means other than the worm wheel 48 and jackscrew 50 could be used to selectively axially move the end of drive shaft 24 and crank 36 toward and away from wiper post 20, such as a solenoid or hydraulic plunger. Therefore, it will be understood that it is not intended to limit the invention to just the embodiment disclosed.

The embodiments of the invention in which an exclusive property or privilege is claimed are defined as follows:

1. A wiper drive system in a vehicle, comprising:
an elongated wiper post defining a longitudinal axis journaled to said vehicle so as to be capable of oscillation about said axis over a predetermined angle corresponding to a wipe pattern,
a drive shaft journaled to said vehicle to rotate about a central axis extending generally perpendicular to said wiper post axis, said drive shaft having a terminal end spaced a predetermined distance from said wiper post,
a spatial mechanism operative between said wiper post and drive shaft to oscillate said wiper post, said spatial mechanism comprising a crank fixed to said drive shaft terminal end, an elongated link having a longitudinal axis intersecting said drive shaft axis pivotally joined to said wiper post by a turning pivot, said link also being joined to said crank by a rocking and sliding joint having a center point, said spatial mechanism having a predetermined spacing defined by the distance of the intersection point of said link and drive shaft axes from the intersection point of said drive shaft central axis with a perpendicular line to said drive shaft central axis drawn from the center point of said rocking and sliding joint, said predetermined spacing being sufficient to produce said predetermined angle, and,
means for moving said drive shaft terminal end and crank relative to said wiper post as said link slides through said rocking and sliding joint, thereby changing said predetermined spacing so as to change said predetermined angle.

2. A wiper system in a vehicle, comprising,
an elongated wiper post defining a longitudinal axis journaled to said vehicle so as to be capable of oscillation about said axis over a predetermined angle corresponding to a wipe pattern,
a drive shaft journaled to said vehicle to rotate about a central axis extending generally perpendicular to said wiper post axis, said drive shaft having a coaxial stub shaft at its terminal end that is axially movable along the axis of said drive shaft toward and away from said wiper post,
a spatial mechanism operative between said wiper post and drive shaft to oscillate said wiper post, said spatial mechanism comprising a crank fixed to said stub shaft, an elongated link having a longitudinal axis intersecting said drive shaft axis and pivotally joined to said wiper post by a turning pivot, said link also being joined to said crank by a rocking and sliding joint having a center point, said spatial mechanism having a predetermined spacing defined by the distance of the intersection point of said link and drive shaft axes from the intersection point of said drive shaft central axis with a perpendicular line to said drive shaft central axis drawn from the center point of said rocking and sliding joint, and,
means for holding said stub shaft relative to said drive shaft and for selectively moving said stub shaft axially relative to said drive shaft so as to move said crank relative to said wiper post as said link slides through said rocking and sliding joint, thereby changing said predetermined spacing so as to change said predetermined angle.

* * * * *